US011514911B2

(12) United States Patent
Johnson et al.

(10) Patent No.: US 11,514,911 B2
(45) Date of Patent: Nov. 29, 2022

(54) REDUCED TRAINING FOR DIALOG SYSTEMS USING A DATABASE

(71) Applicant: Oracle International Corporation, Redwood Shores, CA (US)

(72) Inventors: Mark Edward Johnson, Sydney (AU); Michael Rye Kennewick, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 207 days.

(21) Appl. No.: 16/983,950

(22) Filed: Aug. 3, 2020

(65) Prior Publication Data

US 2021/0082425 A1 Mar. 18, 2021

Related U.S. Application Data

(60) Provisional application No. 62/899,647, filed on Sep. 12, 2019.

(51) Int. Cl.
*G10L 15/22* (2006.01)
*G06F 16/22* (2019.01)
*G06F 16/2455* (2019.01)
*G06N 5/04* (2006.01)
*G06N 20/00* (2019.01)
(Continued)

(52) U.S. Cl.
CPC ............ *G10L 15/22* (2013.01); *G06F 16/221* (2019.01); *G06F 16/2455* (2019.01); *G06N 5/04* (2013.01); *G06N 20/00* (2019.01); *G10L 13/00* (2013.01); *G10L 15/063* (2013.01); *G10L 15/1815* (2013.01); *G10L 15/1822* (2013.01); *G10L 15/30* (2013.01); *G10L 2015/223* (2013.01)

(58) Field of Classification Search
CPC ... G10L 15/22; G10L 15/063; G10L 15/1815; G10L 15/1822; G10L 15/30; G10L 2015/223; G10L 13/00; G06F 16/221; G06N 20/00; G06N 5/04
USPC .............................. 704/270.1, 270, 275, 251
See application file for complete search history.

(56) References Cited

U.S. PATENT DOCUMENTS 10,460,215 B2 * 10/2019 Herold ................ G10L 15/1815
10,467,510 B2 * 11/2019 Albadawi ............ G06V 40/167
(Continued)

OTHER PUBLICATIONS

Bapna et al., "Towards Zero-Shot Frame Semantic Parsing for Domain Scaling", Clinical Orthopaedics and Related Research, Jul. 7, 2017, 5 pages.
(Continued)

*Primary Examiner* — Vijay B Chawan
(74) *Attorney, Agent, or Firm* — Kilpatrick Townsend & Stockton LLP

(57) ABSTRACT

Techniques are described for training and executing a machine learning model using data derived from a database. A dialog system uses data from the database to generate related training data for natural language understanding applications. The generated training data is then used to train a machine learning model. This enables the dialog system to leverage a large amount of available data to speed up the training process as compared to conventional labeling techniques. The dialog system uses the trained machine learning model to identify a named entity from a received spoken utterance and generate and output a speech response based upon the identified named entity.

17 Claims, 9 Drawing Sheets

(51) Int. Cl.
  *G10L 15/30*  (2013.01)
  *G10L 15/06*  (2013.01)
  *G10L 15/18*  (2013.01)
  *G10L 13/00*  (2006.01)

(56) References Cited

U.S. PATENT DOCUMENTS 10,496,905 B2 * 12/2019 Solomon .............. H04R 1/406
10,957,311 B2 *  3/2021 Solomon .............. G10L 15/22
10,970,768 B2 *  4/2021 Zheng ................. G06V 30/40
10,978,059 B2 *  4/2021 Moreno ............... G10L 15/02

OTHER PUBLICATIONS

Craven et al., "Constructing Biological Knowledge Bases by Extracting Information from Text Sources", Proceedings of the Seventh International Conference on Intelligent Systems for Molecular Biology, Aug. 1999, 10 pages.

Dai et al., "Elastic CRFS for Open-Ontology Slot Filling", Speech Processing and Machine Intelligence (SPMI) Lab, Nov. 4, 2018, 5 pages.

Gu et al., "Mechanisms for Automatic Training Data Labeling for Machine Learning", Comparing Mechanism for Automatic Training Data Labeling, Fortieth International Conference on Information Systems, 2019, pp. 1-17.

Herzig et al., "Decoupling Structure and Lexicon for Zero-Shot Semantic Parsing", Proceedings of the 2018 Conference on Empirical Methods in Natural Language Processing, Sep. 22, 2018, 11 pages.

Jones et al., "Bootstrapping for Text Learning Tasks", Computer Science, 1999, 12 pages.

Mintz et al., "Distant Supervision for Relation Extraction Without Labeled Data", Proceedings of the Joint Conference of the 47th Annual Meeting of the ACL and the 4th International Joint Conference on Natural Language Processing of the AFNLP, vol. 2, Aug. 2009, pp. 1003-1011.

Wang et al., "A Survey of Zero-Shot Learning: Settings, Methods, and Applications", ACM Transactions on Intelligent Systems and Technology, vol. 10, No. 2, Jan. 2019, pp. 13:1-13:37.

* cited by examiner

| | 502 | 504 | 506 | 508 | 510 | 512 |
|---|---|---|---|---|---|---|
| | Brand | Size | Color | Style | Stock Status | Price |
| | Allen's | 4 | Black | Loafer | OUT | $59.99 |
| | Joe Schmo | 5 | Black | Sandal | IN | $34.99 |
| | Runner's | 12 | White | Running | IN | $79.99 |
| | Lily Lane | 7 | Red | Pump | IN | $220 |
| | Tina Ross | 11 | Pink | Flat | OUT | $149.99 |
| | Zeus | 5 | Blue | Tennis | IN | $89.99 |
| | Zeus | 6 | White | Tennis | IN | $84.99 |
| | ... | ... | ... | ... | ... | ... |

500 — 514 (columns 502–508), 516 (columns 510–512)

FIG. 5A

| | 552 | 554 | 556 | 558 | 560 | 562 |
|---|---|---|---|---|---|---|
| | Brand | Size | Color | Style | Stock Status | Price |
| | Maxy | 32R | Beige | Casual | OUT | $64.99 |
| | Maxy | 33L | Black | Dress | IN | $199.99 |
| | Zeus | 40S | Blue | Sport | OUT | $14.99 |
| | Jimmy's | 38R | Navy | Dress | IN | $60 |
| | Tom Tom | 29L | Grey | Casual | IN | $150.00 |
| | Cricket | 42R | Beige | Jean | IN | $120.00 |
| | Jimmy's | 35R | Blue | Jean | IN | $42.99 |
| | ... | ... | ... | ... | ... | ... |

550 — 564 (columns 552–558), 566 (columns 560–562)

FIG. 5B

REDUCED TRAINING FOR DIALOG SYSTEMS USING A DATABASE

CROSS-REFERENCE TO RELATED APPLICATIONS

The present application claims the benefit and priority under 35 U.S.C. 119(e) of U.S. Application No. 62/899,647, filed on Sep. 12, 2019, entitled "DATABASE-ORIENTED DIALOG TECHNIQUES," the content of which is herein incorporated by reference in its entirety for all purposes.

TECHNICAL FIELD

The present disclosure relates generally to dialog systems. More specifically, but not by way of limitation, this disclosure describes techniques for improving the efficiency of training and applying machine learning models for dialog processing tasks using databases.

BACKGROUND

An increasing number of devices now enable users to interact with the devices directly using voice or spoken speech. For example, a user can speak to such a device in a natural language where the user may ask a question or make a statement requesting some action to be performed. In response, the device performs the requested action or responds to the user's question using voice output. Since interacting directly using voice is a more natural and intuitive way for humans to communicate with their surroundings, the popularity of such speech-based systems is growing at an astronomical rate.

In conventional systems, a dialog system uses a machine-learning model which has been trained on labeled data. Labeling the data is traditionally accomplished by hand, and can be a tedious and time-consuming process. The more data used to train the model, generally, the more accurately the model is able to make predictions. However, the desire to improve the model with a great deal of training data is in tension with the practicality of hand-labeling a large corpus of data.

BRIEF SUMMARY

The present disclosure relates generally to dialog systems. More particularly, techniques are described for using a database to train a machine learning model which is then used to execute a task responsive to speech input. Various embodiments are described herein, including methods, systems, non-transitory computer-readable storage media storing programs, code, or instructions executable by one or more processors, and the like.

In certain embodiments, a dialog system receives a spoken utterance. The dialog system identifies a named entity from the spoken utterance using a machine learning model. The machine learning model has been trained on data extracted from a database that maps a plurality of named entities to respective named entity types based upon columns in the database. The dialog system generates a speech response based upon the identified named entity and provides the speech response as output.

In some aspects, the dialog system further extracts raw data from the database, generates training data from the extracted raw data, and trains the machine learning model on the generated training data. In some aspects, generating the training data comprises identifying metadata associated with the columns of the database and using the metadata and corresponding entries of the columns as seed data to generate the training data. In some aspects, the machine learning model is a first machine learning model and the named entity is a first named entity, and the method further comprises identifying a second named entity using a second machine learning model.

In some aspects, the database further comprises a plurality of requestable values and the method further comprises identifying, by the dialog system using the database, a requestable value, of the plurality of requestable values, that maps to the identified named entity, wherein the speech response includes the requestable value or a derivative thereof.

In some aspects, the database comprises a plurality of tables and the method further comprises selecting a particular table from the plurality of tables based upon the identified named entity, wherein the selected table is used to identify the requestable value. In some aspects, identifying the requestable value comprises executing a query on the selected table to retrieve the requestable value mapped to the identified named entity.

Embodiments further include systems and computer-readable media (e.g., a non-transitory computer-readable memory) configured for performing the methods described herein.

The foregoing, together with other features and embodiments will become more apparent upon referring to the following specification, claims, and accompanying drawings.

BRIEF DESCRIPTION OF THE DRAWINGS

FIGS. 5A and 5B are simplified examples of database tables according to certain embodiments.

DETAILED DESCRIPTION

Figure 1A:
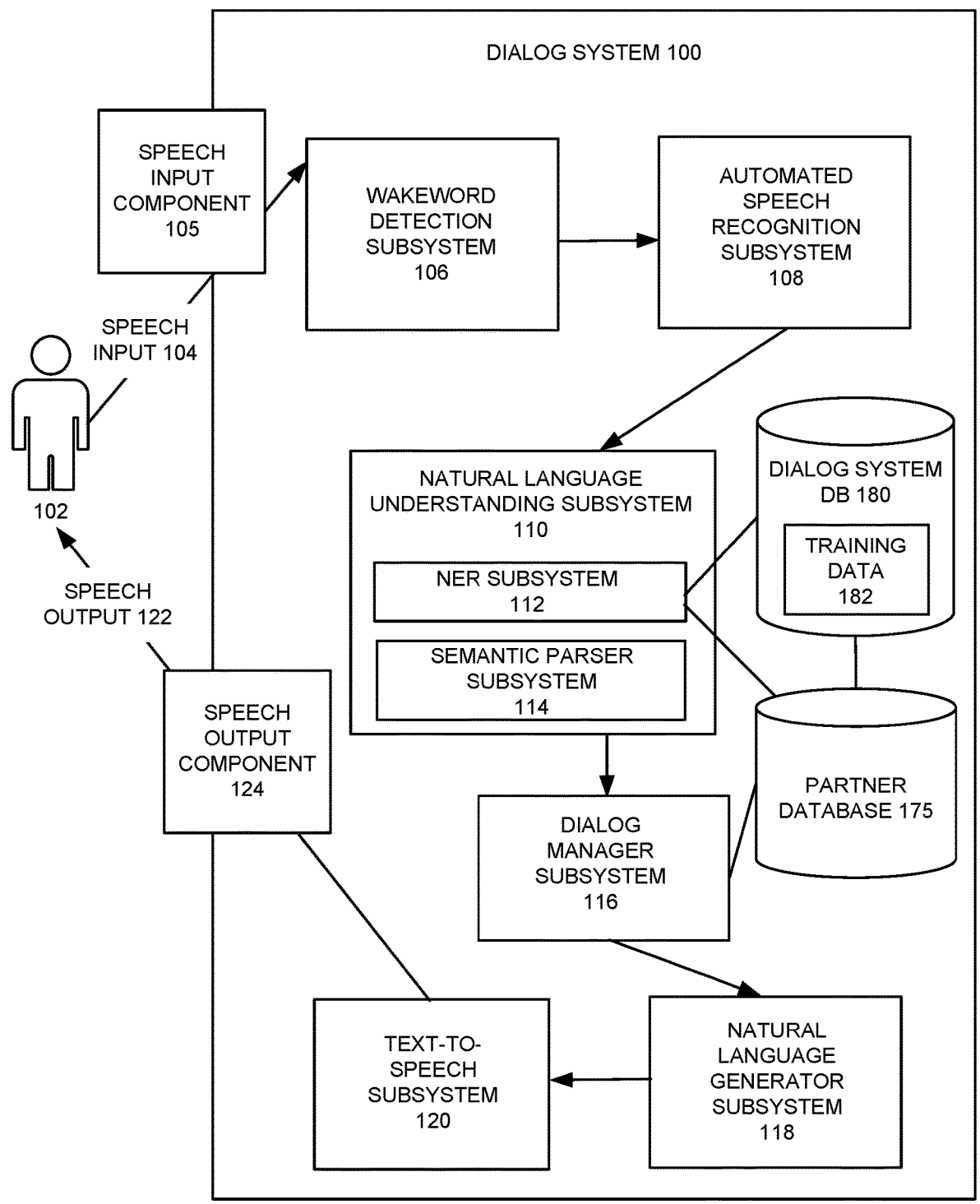
FIGS. 1A and 1B are simplified block diagrams depicting a dialog system according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as exemplary is not necessarily to be construed as preferred or advantageous over other embodiments or designs.

A voice-enabled system that is capable of having a dialog with a user via voice inputs and voice outputs can come in various forms. For example, such a system may be provided as a stand-alone device, as a digital or virtual assistant, as a voice-capable service, and the like. In each of these forms, the system is capable of receiving voice or speech inputs, understanding the inputs, generating responses or taking actions responsive to the inputs, and outputting the responses using voice outputs. In certain embodiments, the dialog functionality in such a voice-enabled system is provided by a dialog system or infrastructure ("dialog system").

Dialog systems commonly use trained machine-learning algorithms. These machine-learning algorithms traditionally require a lengthy and computationally intensive training period before use. Developments have been made in speeding up the training process (e.g., using deep learning). However, attempts to reduce training generally rely on conventional training data and do not reduce the training period as much as is desired.

As noted above, it is common to train machine-learning models for dialog systems on labeled data. Labeling the data is traditionally accomplished by hand, and can be a tedious and time-consuming process, and the improvement in accuracy gained by using larger amounts of training data is in tension with the practicality of hand-labeling a large corpus of data.

According to some embodiments, the training phase for a machine learning model can be reduced or eliminated, as compared to the traditional methods described above, using information derived from a preexisting database. In certain embodiments, large amounts of training data can be uploaded from databases or knowledge bases to a natural language understanding (NLU) system that will stochastically generate related training data derived from the uploaded data. This enables rapid training and improved accuracy of machine learning models such as named entity recognizers and semantic parsers for bot applications. The dialog system can use properties of the database, such as column headings, to train a machine learning model, greatly reducing or even eliminating the amount of effort needed to generate training data.

In some embodiments, such machine learning models may be implemented as Named Entity Recognizers (NERs). NERs are models trained to recognize the names of things, which can be proper names (e.g., Florida), goods (e.g., shoes), services (e.g., massage), and so forth. The NERs may also be trained to recognize descriptive words or phrases such as colors and sizes. Accordingly, "named entity" as used herein can include words or phrases that a machine learning model has been trained to identify, including things, as well as words or phrases associated with such things. Upon recognizing a named entity, the NER may label the corresponding word or phrase with a named entity type. A named entity type is a category of named entity. For example, the phrase New York is labeled with the named entity type city, and the word seventy is labeled with the named entity type temperature.

In some embodiments, the same database used to train the machine learning model is used at runtime to answer queries received via user input. Columns in each table in the database are designated as informable columns and/or requestable columns. Informable columns are columns containing words or phrases that a user may provide to specify a request ("informable values"). An example of an informable values is Earth in the user query "How old is the Earth?". Requestable columns are columns containing words or phrases that may requested by a user and potentially included in a response prepared by the system ("requestable values"). Examples of requestable values include 5,000 (e.g., a requested distance) and in-stock (e.g., a requested availability status). The dialog system may identify such informable and/or requestable values in received speech input. The dialog system may use the identified values to execute a query on a table in the database, to retrieve and provide information requested by a user.

As a non-limiting example for the sake of illustration, a retail store partner supplies a dialog system with a database containing tables with descriptions of products. One table might contain a description of men's shoes, with size, color, style, material, manufacturer, price, etc. as "informable" columns, and stock availability, price, etc., as "requestable" columns. The "informable" columns are columns that may be received as user input (e.g., as part of a query). The "requestable" columns are columns that may be identified for user output and/or to execute a task responsive to a user query. The dialog system trains a set of machine learning models to recognize the each of the possible sizes, possible colors, manufacture's names, etc.

From each informable database table column, the dialog system extracts a list of all the distinct names in that column. The dialog system uses the list of distinct names as seed data to train a Named Entity Recognizer (NER), which can recognize entities that are relevant to that database column. This is repeated for each database column, resulting in a set of NERs.

The dialog system receives a user query "Do you have any Nike® running shoes in size 12?". When the user query is received, the dialog system executes the set of NERs on the user query. A "manufacturer" NER recognizes Nike®, a "shoe style" NER recognizes "running shoes," and a "size" NER recognizes "12" as a possible shoe size. The dialog system uses the matches that these NERs make to identify which database table the user is likely to be asking for information about. Because the manufacturer, shoe style, and size NERs match the user query, the dialog system decides that this query probably concerns the database table about shoes.

If the user has supplied a sufficient number of informable values to execute a query to retrieve the requested information, then the dialog system executes the query. Otherwise, the dialog system prompts the user to supply additional information. For example, after consulting the table, the dialog system asks the user for informable column information by requesting that the user provide the location of the store that the user wants information about.

Once the dialog system has sufficient information to execute the query, the dialog system executes the query on the database table storing information about shoes. The result of the query is a set of matching database table entries. Requestable information associated with these database entries is delivered to the user as output. For example, the price and the stock availability of the shoes are identified and supplied to the user.

Figure 1B:
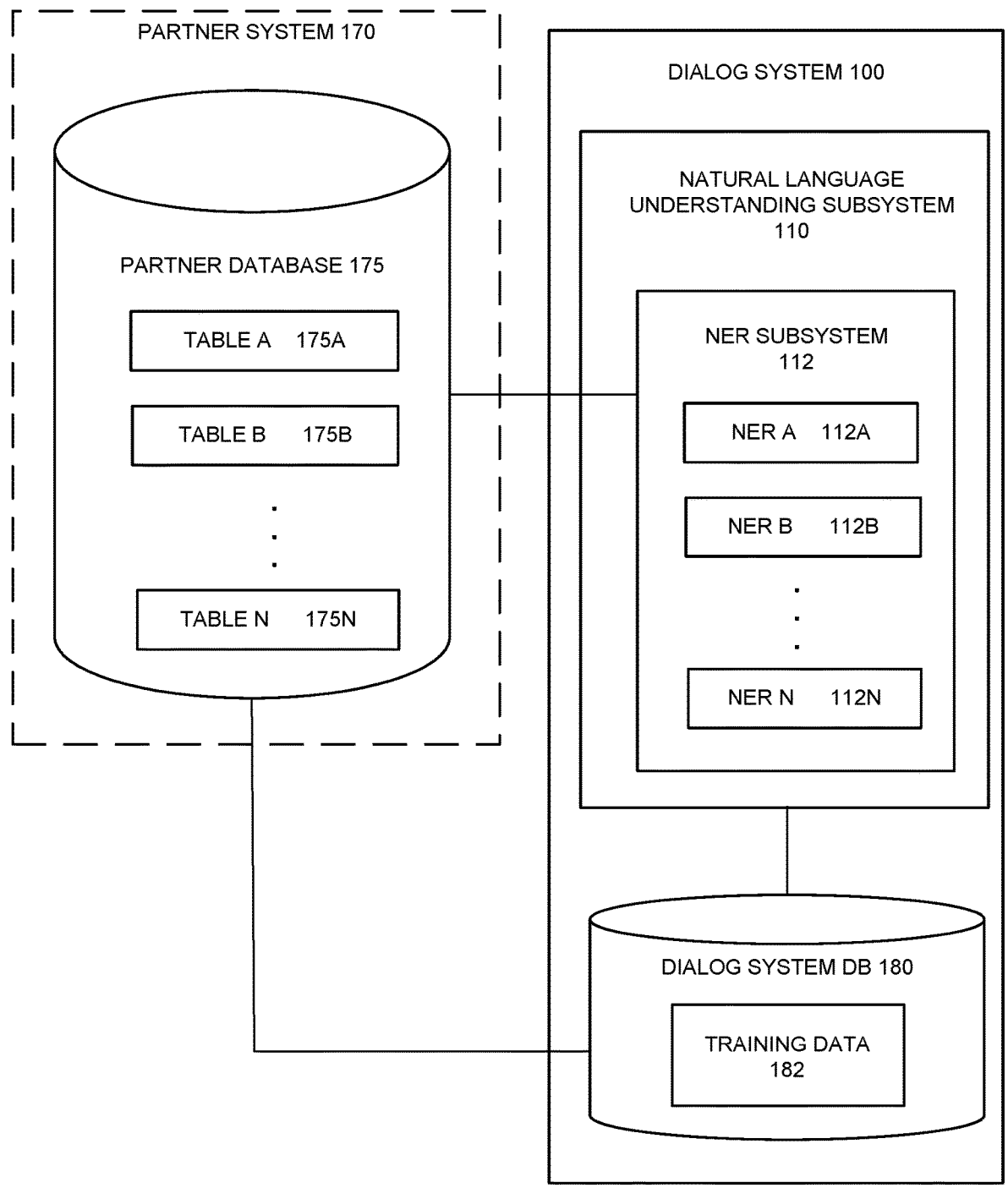

FIGS. 1A and 1B illustrate an example of a dialog system 100, according to some embodiments. The dialog system 100 is a specialized computing system that may be used for processing large amounts of data using a large number of computer processing cycles. The numbers of devices depicted in FIGS. 1A and 1B are provided for illustrative purposes. Different numbers of devices may be used. For example, while each subsystem depicted in FIG. 1A is shown as a single device, multiple devices may instead be used.

Referring to FIG. 1A, the dialog system 100 is configured to receive voice or speech inputs 104 (also referred to as spoken utterances or speech utterances) from a user 102. The dialog system 100 may then interpret the voice inputs. The dialog system 100 may maintain a dialog with the user 102, and possibly perform or cause one or more actions to be performed based upon interpretations of the voice inputs. The dialog system 100 may prepare appropriate responses, and output the responses to the user using voice or speech output.

In certain embodiments, the processing performed by a dialog system is implemented by a pipeline of components or subsystems, including a speech input component 105, a wake-word detection (WD) subsystem 106, an automatic speech recognition (ASR) subsystem 108, a natural language understanding (NLU) subsystem 110, which includes a named entity recognizer (NER) subsystem 112 and a semantic parser subsystem 114, a dialog system database 180, a partner database 175, a dialog manager (DM) subsystem 116, a natural language generator (NLG) subsystem 118, a text-to-speech (TTS) subsystem 120, and a speech output component 124. The subsystems listed above may be implemented only in software (e.g., using code, program, or instructions executable by one or more processors or cores), in hardware, or in a combination of hardware and software. In certain implementations, one or more of the subsystems may be combined into a single subsystem. Additionally or alternatively, in some implementations, the functions described herein as performed by a particular subsystem may be implemented by multiple subsystems.

The speech input component 105 includes hardware and software configured to receive speech input 104. In some instances, the speech input component 105 may be part of the dialog system 100. In some other instances, the speech input component 105 may be separate from and be communicatively coupled to the dialog system 100. The speech input component 105 may, for example, include a microphone coupled to software configured to digitize and transmit speech input to the wake-word detection subsystem 106.

The wake-word detection (WD) subsystem 106 is configured to listen for and monitor a stream of audio input for input corresponding to a special sound or word or set of words (referred to as a wake-word). Upon detecting the wake-word configured for the dialog system 100, the WD subsystem 106 is configured to activate the ASR subsystem 108. In certain implementations, a user may be provided the ability to activate or deactivate the WD subsystem 106 (e.g., by speaking the wake-word pushing a button). When activated (or operating in active mode), the WD subsystem 106 is configured to continuously receive an audio input stream, and process the audio input stream to identify audio or voice input corresponding to the wake-word. When audio input corresponding to the wake-word is detected, the WD subsystem 106 activates the ASR subsystem 108.

As described above, the WD subsystem 106 activates the ASR subsystem 108. In some implementations of the voice-enabled system, mechanisms other than wake-words may be used to trigger or activate the ASR subsystem 108. For example, in some implementations, a push button on a device may be used to trigger the ASR subsystem 108 processing without needing a wake-word. In such implementations, the WD subsystem 106 may not be provided. When the push button is pressed or activated, the speech input received after the button activation is provided to the ASR subsystem 108 for processing. In some implementations, the ASR subsystem 108 may be activated upon receiving an input to be processed.

The ASR subsystem 108 is configured to receive and monitor spoken voice input after a trigger or wake-up signal (e.g., the wake-up signal may be sent by the WD subsystem 106 upon the detection of a wake-word in the speech input, the wake-up signal may be received upon the activation of a button, etc.) and to convert the voice input to text. As part of its processing, the ASR subsystem 108 performs speech-to-text conversion. The spoken speech or voice input may be in a natural language form, and the ASR subsystem 108 is configured to generate the corresponding natural language text in the language of the speech input. The text generated by the ASR subsystem is then fed to the NLU subsystem 110 for further processing. The voice input received by the ASR subsystem 108 may include one or more words, phrases, clauses, sentences, questions, etc. The ASR subsystem 108 is configured to generate a text utterance for each spoken clause and feed the text utterances to the NLU subsystem 110 for further processing.

The NLU subsystem 110 receives texts generated by the ASR subsystem 108. The texts received by the NLU subsystem 110 from the ASR subsystem 108 may include text utterances corresponding to spoken words, phrases, clauses, etc. The NLU subsystem 110 translates each text utterance (or a series of text utterances) to its corresponding logical form.

In certain implementations, the NLU subsystem 110 includes a named entity recognizer (NER) subsystem 112 and a semantic parser (SP) subsystem 114. The NER subsystem 112 receives a text utterance as input, identifies named entities in the text utterance, and tags the text utterance with information related to the identified named entities.

As further described below with respect to FIG. 1B, the NER subsystem 112 is communicatively coupled to a dialog system database 180 which stores training data 182. The NER subsystem 112 includes one or more NERs which are trained on the training data 182. The training data 182 is derived from tables in partner database 175, as described herein. In some embodiments, the NER subsystem 112 uses the partner database 175 at runtime to select tables in the partner database 175 corresponding to identified named entities.

The tagged text utterances generated by the NER subsystem 112 are fed to the SP subsystem 114, which is configured to generate a logical form for each tagged text utterance (or for a series of tagged text utterances). The logical form generated for an utterance may identify one or more intents corresponding to the text utterance. An intent for an utterance identifies an objective of the utterance. Examples of intents include "order pizza" and "find directions." An intent may, for example, identify an action that is requested to be performed. In addition to intents, a logical form generated for a text utterance may also identify slots (also referred to as parameters or arguments) for the identified intent. For example, for the speech input "I'd like to order a large pepperoni pizza with mushrooms and olives," the NLU subsystem 110 can identify the intent order pizza. The NLU subsystem can also identify and fill slots, e.g., pizza size (filled with large) and pizza toppings (filled with mushrooms and olives). The NLU subsystem may use machine learning based techniques, rules (which may be domain specific), or a combination of the two, to generate the logical forms. The logical forms generated by the NLU subsystem 110 are then fed to the DM subsystem 116 for further processing.

The DM subsystem 116 is configured to manage a dialog with the user based upon logical forms received from the NLU subsystem 110. As part of the dialog management, the DM subsystem 116 is configured to track dialog states, initiate the execution of or itself execute one of more actions or tasks, and determine how to interact with the user. These actions may include, for example, querying one or more databases, producing execution results, and other actions. For example, the DM subsystem 116 is configured to interpret the intents identified in the logical forms received from the NLU subsystem 110. Based upon the interpretations, the DM subsystem 116 may initiate one or more actions that it interprets as being requested by the voice inputs provided by the user. In some embodiments, the DM subsystem 116 uses the partner database 175 to identify requested information, as further described with respect to FIG. 4.

In certain embodiments, the DM subsystem 116 performs dialog states tracking based upon current and past voice inputs and based upon a set of rules (e.g., dialog policies) configured for the DM subsystem 116. These rules may specify the different dialog states, conditions for transitions between states, actions to be performed when in a particular state, and the like. These rules may be domain specific. The DM subsystem 116 also generates responses to be communicated back to the user involved in the dialog. These responses may be based upon actions initiated by the DM subsystem 116 and their results. The responses generated by the DM subsystem 116 are fed to the NLG subsystem 118 for further processing.

The NLG subsystem 118 is configured to generate natural language texts corresponding to the responses generated by the DM subsystem 116. The texts may be generated in a form that enables them to be converted to speech by the TTS subsystem 120. The TTS subsystem 120 receives the texts from the NLG subsystem 118 and converts each of them to speech or voice audio, which may then be output to the user via an audio or speech output component 124 of the dialog system (e.g., a speaker, or communication channel coupled to an external speaker). In some instances, the speech output component 124 may be part of the dialog system 100. In some other instances, the speech output component 124 may be separate from and communicatively coupled to the dialog system 100.

As described above, the various subsystems of the dialog system 100 working in cooperation provide the functionality that enables the dialog system 100 to receive speech inputs 104 and respond using speech outputs 122 and maintain a dialog with a user using natural language speech. The various subsystems described above may be implemented using a single computer system or using multiple computer systems working cooperatively. For example, for a device implementing the voice-enabled system, the subsystems of the dialog system 100 described above may be implemented entirely on the device with which the user interacts. In some other implementations, some components or subsystems of the dialog system 100 may be implemented on the device with which the user interacts, while other components may be implemented remotely from the device, possibly on some other computing devices, platforms, or servers.

As described above, in certain embodiments, a dialog system 100 may be implemented using a pipeline of subsystems. In some embodiments, one or more of the subsystems may be combined into a single subsystem. In certain embodiments, the functionality provided by a particular subsystem may be provided by multiple subsystems. A particular subsystem may also be implemented using multiple subsystems.

In certain embodiments, machine learning techniques may be used to implement one or more functions of the dialog system 100. For example, supervised machine learning techniques such as those implemented using a neural network (e.g., a deep neural network) may be used to implement one or more functions of the dialog system 100. As one example, a neural network may be provided that is trained to perform ASR functions performed and such a trained model may be used by the ASR subsystem 108 for its processing. Such a neural network implementation may take the speech input as input and output a text utterance to the NLU subsystem. Machine learning based models may also be used by other subsystems of the dialog system 100.

Referring now to FIG. 1B, the NER subsystem 112 of the dialog system 100 may further include a plurality of NERs (NER A 112A, NER B 112B, . . . NER N 112N). The NERs are machine learning models which have been trained to recognize named entities in a particular category. For example, the dialog system may maintain a NER for recognizing prices, an NER for recognizing brand names, and an NER for recognizing colors.

Each NER is trained on training data 182 which can be stored in dialog system database 180. The dialog system database 180 may be a storage unit and/or device (e.g., a file system, database, collection of tables, or other storage mechanism) for storing data. The dialog system database 180 may include multiple different storage units and/or devices. The dialog system database 180 may be local to the dialog system (e.g., local storage) and/or connected to the dialog system over a network (e.g., cloud storage). The training data 182 is derived from data extracted from a partner database 175.

In some embodiments, the partner database 175 is part of a partner system 170. The partner database 175 may, for example, be a corporate ontology or knowledge base that stores information that the partner system 170 uses to perform various tasks (e.g., order fulfillment, inventory management, and so forth). The partner database 175 may be a storage unit and/or device (e.g., a file system, database, collection of tables, or other storage mechanism) for storing data. The partner database 175 may include multiple different storage units and/or devices.

The partner system 170 may be associated with an entity that works in partnership with the dialog system 100. In some embodiments, the partner system 170 provides raw data from partner database 175 to the dialog system 100, which the dialog system 100 will process for performing dialog-related tasks for the partner system 170. For example, the partner system 170 may be managed by a store that stores data related to inventory in the partner database 175, and uses the data stored in the partner database 175 to fulfill and keep records of transactions related to the inventory. Other examples of partner systems include systems that store scientific data (e.g., a university that stores geological and biological data) and systems that store information about different restaurants (e.g., a restaurant computing system that stores information such as location, menu, and opening hours of different restaurant locations).

In some embodiments, the partner database 175 includes a plurality of tables (table A 175A, table B 175B, . . . table N 175N). Each table stores a particular category of data. For example, the partner system 170 is managed by an entity that sells clothing, and the various tables corresponds to categories of clothing sold by the entity such as shirts, pants, and the like. As a specific example, the partner database 175 stores tables as illustrated in FIGS. 5A and 5B. A first table stores information related to women's shoes, as illustrated in FIG. 5A. A second table stores information related to men's pants, as illustrated in FIG. 5B. As another example, a database may store tables including a table storing information related to manicure types, a table storing information related to pedicure types, and a table storing information related to massage types. As another example, a database may store tables including a table storing information related to stars (e.g., name, weight, luminosity), a table storing information related to planets, and a table storing information related to comets.

In some embodiments, the dialog system 100 obtains data from the tables 175A, 175B, . . . 175N of the partner database 175. The dialog system 100 may, at an initial time or periodically, download data from the partner database 175. The data may be used to generate the training data 182, as described below with respect to FIG. 3.

Figure 2:
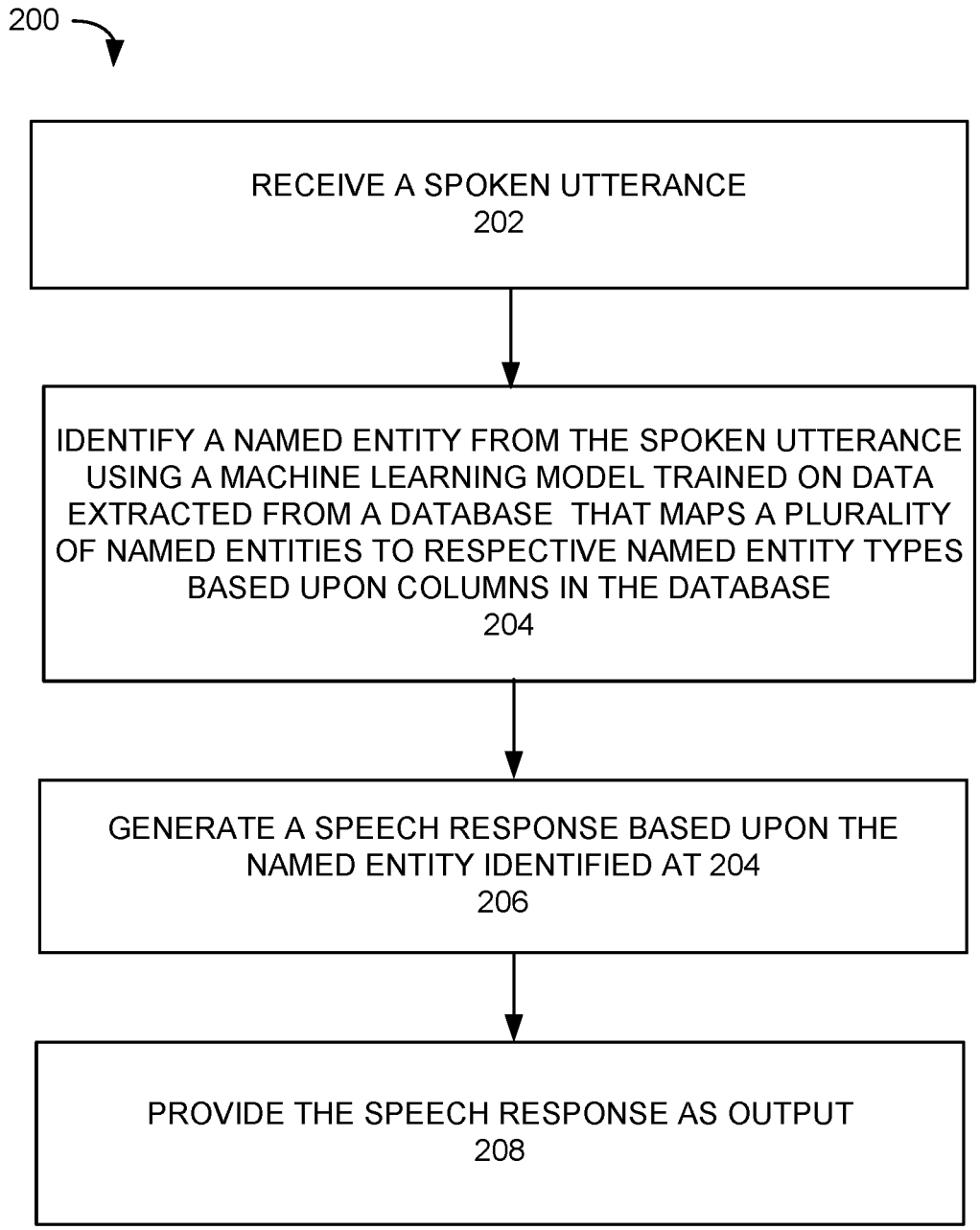
FIG. 2 is a simplified flowchart depicting a method for processing speech input using a machine learning model that has been trained on data derived from a database according to certain embodiments.

FIG. 2 depicts a simplified flowchart illustrating a method 200 for processing speech input using a machine learning model that has been trained on data derived from a database according to some embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 2 may be performed by the NLU subsystem 110 of FIGS. 1A and 1B in cooperation with other components of the dialog system 100 described above.

At 202, the dialog system receives a spoken utterance. The dialog system may, for example, receive the spoken utterance from a user via the speech input component 105. The spoken utterance may be received as a wave form. The spoken utterance may be in a particular language and be in a natural language query form. The spoken utterance may specify a question that the user wants the dialog system to answer, specify one or more actions that the user wants the dialog system to initiate (e.g., "I would like a medium pepperoni pizza."), and the like. The ASR subsystem 108 may process the spoken utterance to generate a text utterance, which the ASR subsystem 108 passes to the NLU subsystem 110 for further processing.

In certain embodiments, instead of receiving a spoken utterance (as in 202), input may be received in text form, for example, when a user types in text during a chat with a dialog system. The techniques described in this disclosure can be used with systems that receive input in the form of spoken speech, or text input, or combinations thereof.

At 204, the dialog system identifies a named entity from the spoken utterance received at 202 using a machine learning model. The machine learning model has been trained on data extracted from a database. The database maps a plurality of named entities to respective named entity types based upon columns in the database, as described below with respect to FIG. 3. The model has been trained to recognize named entities from speech input. Such a model trained to recognize named entities is referred to as a Named Entity Recognizer (NER).

In some embodiments, the dialog system applies the machine learning model to an utterance corresponding to the speech input to identify the named entity. For example, based upon the speech input "I would like to book a flight to Bora Bora," a named entity recognizer analyzes each word and identifies the named entity "Bora Bora." Identifying a named entity may include labeling, or otherwise associating, one or more words in the utterance with a named entity type (e.g., Bora Bora is labeled with the named entity type "location").

In some embodiments, the dialog system identifies a plurality of named entities from the speech input using a corresponding plurality of machine learning models. The plurality of named entities may be identified using multiple specialized NERs. For example, the dialog system executes a NER for size and an NER for style to recognize "7" as a size and "loafer" as a style. Accordingly, in some embodiments, the dialog system includes a first machine learning model and a second machine learning model. The dialog system identifies a first named entity using the first machine learning model (e.g., by executing an NER for shoe styles on an utterance derived from speech input to identify the named entity "pumps"). The dialog system identifies a second named entity using the second machine learning model (e.g., by executing an NER for shoe sizes on an utterance derived from the speech input to identify the named entity "10"). Alternatively, or additionally, the dialog system may execute an NER that has been trained to recognize multiple named entity types (e.g., an NER that recognizes both sizes and styles).

The dialog system may determine a logical form based upon the identified named entity. The dialog system may further use additional words discerned from the speech input in determining the logical form (e.g., for tasks such as disambiguation and slot filling). The dialog system may determine an intent for the spoken utterance. For example, a set of rules may assign a book travel intent if the utterance includes the words "book" or "purchase" along with "flight" or "car" or "train." The dialog system may fill slots based upon words identified in the utterance (e.g., the dialog system may assign pepperoni to a toppings slot).

At 206, the dialog system generates a speech response based upon the named entity and logical form identified at 204. In some embodiments, generating the response may include identifying values ("requestable values") using the partner database, as further described below with respect to FIG. 4. The dialog system may generate the response by packaging the identified requestable value(s), potentially with additional words or phrases. In some embodiments, the dialog system prepares a response that approximates a natural conversation with a person. The dialog system may add explanatory phrases to the values to do so. The response may include a value (e.g., "The shoes cost $50," where $50 is the identified value). Alternatively, or additionally, the response may include information prepared based upon a identified value (e.g., the dialog system retrieves the value IN STOCK, and returns the output "Yes, we have a red Ferrari available.").

In some embodiments, the dialog system generates speech output. The dialog system generates a text response via the dialog manager subsystem 116 and NLG subsystem 118. The dialog system may output the text response to the text-to speech subsystem 120, which converts the text response to a speech response.

At 208, the dialog system provides the speech response as output. The dialog system may output a spoken response as speech output 122 via speech output component 124 (e.g., to a user). Alternatively, or additionally, the output response may be presented as text (e.g., a text response generated by NLG subsystem 228 can be output via a visual output device such as a screen).

In some embodiments, the dialog system may further execute a task corresponding to the identified requestable values. For example, the system may place a food order, book a flight, and so forth.

Figure 3:
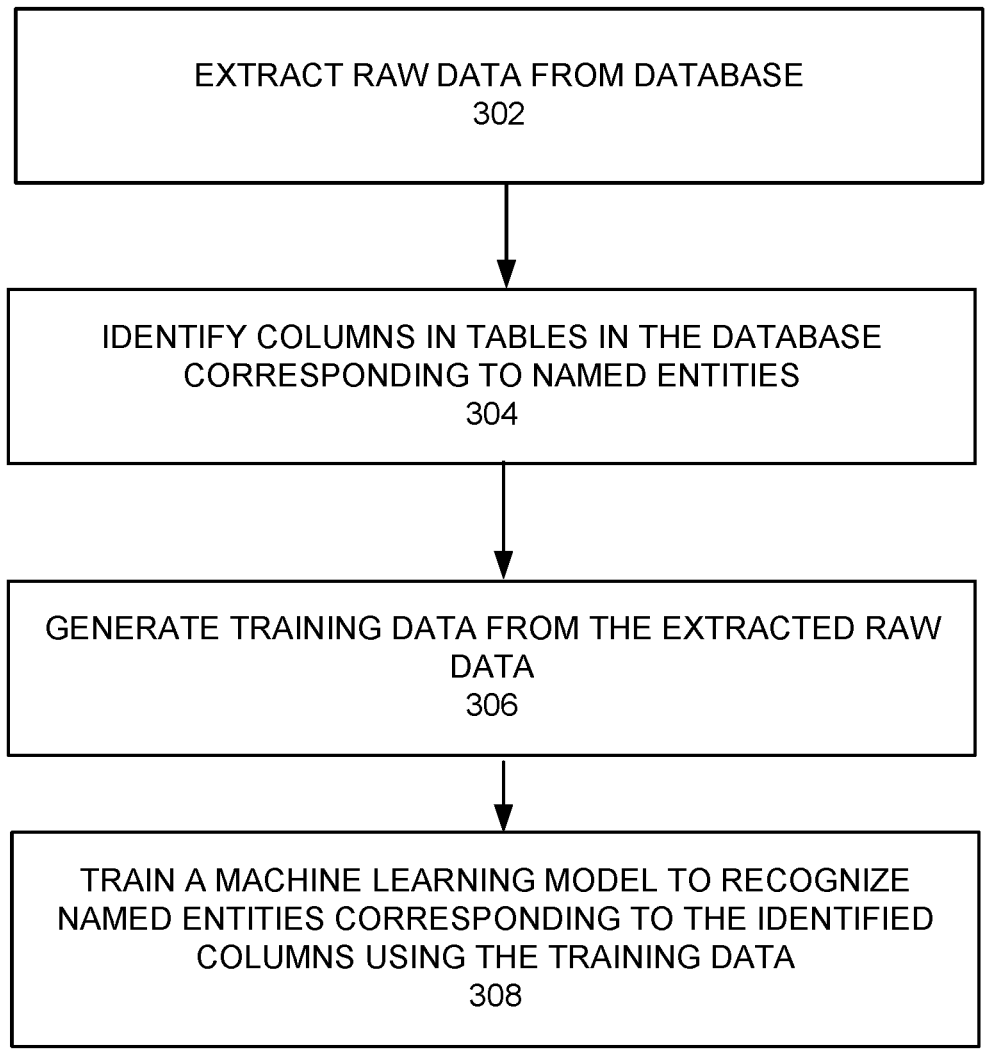
FIG. 3 is a simplified flowchart depicting a method for training a machine learning model as used in the method of FIG. 2 according to certain embodiments.

FIG. 3 depicts a simplified flowchart illustrating a method 300 for training the machine learning model used at block 204 of FIG. 2 according to some embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 3 may be performed by the NLU subsystem 110 of FIGS. 1A and 1B in cooperation with other components of the dialog system 100 described above.

At 302, the dialog system extracts raw data from a database (e.g., partner database 175). The dialog system may upload large amounts of data from a database managed by a partner system 170. In some embodiments, partner system 170 (e.g., a computing system associated with a company that enlists the dialog system to perform dialog processing services) supplies the dialog system with a partner database 175 containing multiple tables. The data extracted from the partner database 175 is "raw" in that it has not been labeled or otherwise processed for training. The dialog system may extract some or all of the raw data from the database. Extracting the raw data may include transmitting the data over a network from the partner system to the dialog system. The data may be transmitted by suitable means such as an API pull, a data ingestion pipeline, and/or a message transmitted over a network. The extracted data may be stored to the dialog system for further processing.

At 304, the dialog system identifies columns in tables in the database corresponding to named entities. The database maps a plurality of named entities to respective named entity types based upon columns in the database. For example, as illustrated in FIGS. 5A and 5B, the database may include a plurality of columns. Each column includes a heading that specifies a type of data stored in that column (and listed below in the example illustrated in FIGS. 5A and 5B). The information in the database, and/or supplementary data associated with the database, can be used to discern a named entity type for the entries (named entities) in the corresponding column. In some cases, a subset of the columns may correspond to named entities. In such cases, the partner system furnishing the database may specify that certain columns correspond to a named entity. The named entity status of a column may be specified generally (e.g., named entity columns tagged with 1, other columns tagged with 0). Alternatively, or additionally, the named entity status of a column may be specified as a specific named entity type (e.g., shoe sizes). In some cases, the dialog system may determine named entity types based on column metadata. For example, column metadata specifies that entries in a particular column are the names of paintings. Based on this column metadata, the dialog system determines that the column is for the named entity type Painting.

In some embodiments, the dialog system identifies columns in the database corresponding to informable values and requestable values. Each column in each table in the database may be classified as "informable" or "requestable." Informable means that the user can provide this information. Requestable means that the user can ask for this information. In some embodiments, the dialog system identifies the columns in the tables as informable or requestable based upon information provided by the partner system. For example, the partner system may provide, along with access to the database, a file specifying that certain columns are informable and certain columns are requestable. As another example, the partner system may add metadata to column headers indicating that each column is informable and/or requestable. In some cases, the dialog system may establish that the informable columns are named entity columns.

At 306, the dialog system generates training data from the extracted raw data. In some embodiments, from each named entity-designated database table column identified at 304, the dialog system extracts a list of each distinct name in that column. The dialog system may stochastically generate training data using the extracted information. In some embodiments, the dialog system labels each distinct name with a named entity type. The named entity type may be automatically determined by the dialog system using the table metadata and/or other information obtained at 304. Generating the training data may include identifying metadata associated with columns of the database and using the metadata and corresponding entries of the columns as seed data to generate the training data. For example, metadata associated with a particular column may be used to label each entry in the column with the named entity type "shoe sizes." The dialog system identifies the column label and applies that column label, or a derivative thereof, in labeling each distinct name in that column.

In some embodiments, the dialog system uses a bootstrapping algorithm to produce the training data. Bootstrapping algorithms involve learning from unlabeled data. One way to do so is to estimate labels for unlabeled data, incorporate the labels as training data for the bootstrapping algorithm, and iterate the process. This bootstrapping process generally starts with a small amount of seed data (e.g., hand-labeled data). (See, e.g., R. Jones, A. McCallum, K. Nigam, and E. Riloff, Bootstrapping for text learning tasks, in *IJCAI-99 Workshop on Text Mining: Foundations, Techniques and Applications* 1999). Alternatively, or additionally, the dialog system uses zero-shot learning techniques to train the machine learning model(s). In zero-shot learning, a system is trained on both labeled and unlabeled data. Knowledge in the trained data is transferred so that the system can also label the unlabeled data. This can be done by using labeled training data corresponding to "seen classes" along with information about how "unseen classes" relate to the seen classes. (See, e.g., Wang, W, Zheng, V., Yu, H, Miao, C, A Survey of Zero-Shot Learning: Settings, Methods, and Applications, *In ACM Transactions on Intelligent Systems and Technology*, Article No. 13, available at https://doi.org/10.1145/3293318 (January 2019)).

In some embodiments, the metadata of the database can be used as the seed data without requiring hand-labeling. For example, the dialog system can automatically extract labels from a column header and apply it to entries in that column. As a specific example, the database includes a set of tables, each table including a columns designated for "size." The dialog system automatically labels entries in those columns with the named entity type "size." The dialog system then initiates a bootstrapping process to produce labels for additional entries in the database and/or fine-tune the labeling process. The dialog system may iterate bootstrapping to fine-tune labels to specify "shoe size," "men's pant size," and "women's pant size" for a set of values in a table based upon database metadata designating corresponding columns in the database as "size" columns, as well as contextual information in each table. As a specific example, the bootstrapping algorithm predicts that a particular table is likely for men's pants given the brand names, sizes, and prices stored therein. Therefore, the dialog system determines that the "size" column in that table is for men's pant sizes.

At 308, the dialog system trains the machine learning model to recognize named entities corresponding to the identified columns using the generated training data. The dialog system trains the machine learning model to recognize named entities corresponding to the columns identified at 304. The dialog system trains the machine learning model (e.g., an NER) using the training data generated at 306.

As described above with respect to 306, in some embodiments, zero-shot learning techniques may be applied by using database columns with known types (e.g., "men's shoe sizes"=named entity type) to extend to specified classes based upon supplemental information (e.g., women's shoe sizes include similar numerical entries as men's shoe sizes). Accordingly, after processing the initial training data, the partner database 175 can add additional tables that are unseen by the dialog system. The dialog system will still be able to answer questions using the new tables.

In some embodiments, the dialog system trains a plurality of machine learning models, each trained to recognize a particular type of named entity. For example, the dialog system may train a set of specialized NERs to recognize specific types of named entities: a "shoe size" NER is trained to recognize shoe sizes and a "color" NER is trained to recognize colors. The dialog system may train a set of NER models to recognize each of the possible table entries, or a subset of the table entries (e.g., sizes, possible colors, manufacture's names, etc.).

In some embodiments, the dialog system uses the techniques of FIG. 3 to train other types of dialog processing models. For example, instead of one or more NERs, the dialog system may apply the techniques to machine learning models such as semantic parsers. A semantic parser may be trained on data derived from a database in a similar fashion as described above with respect to FIG. 3. For example, a semantic parser is trained to fill slots by recognizing data types as specified by column metadata at the training phase. The trained semantic parser may then be used in a similar fashion as described above with respect to FIG. 2 to fill slots based on user input, where the slot filling may ultimately be used in providing a response to a user.

Figure 4:
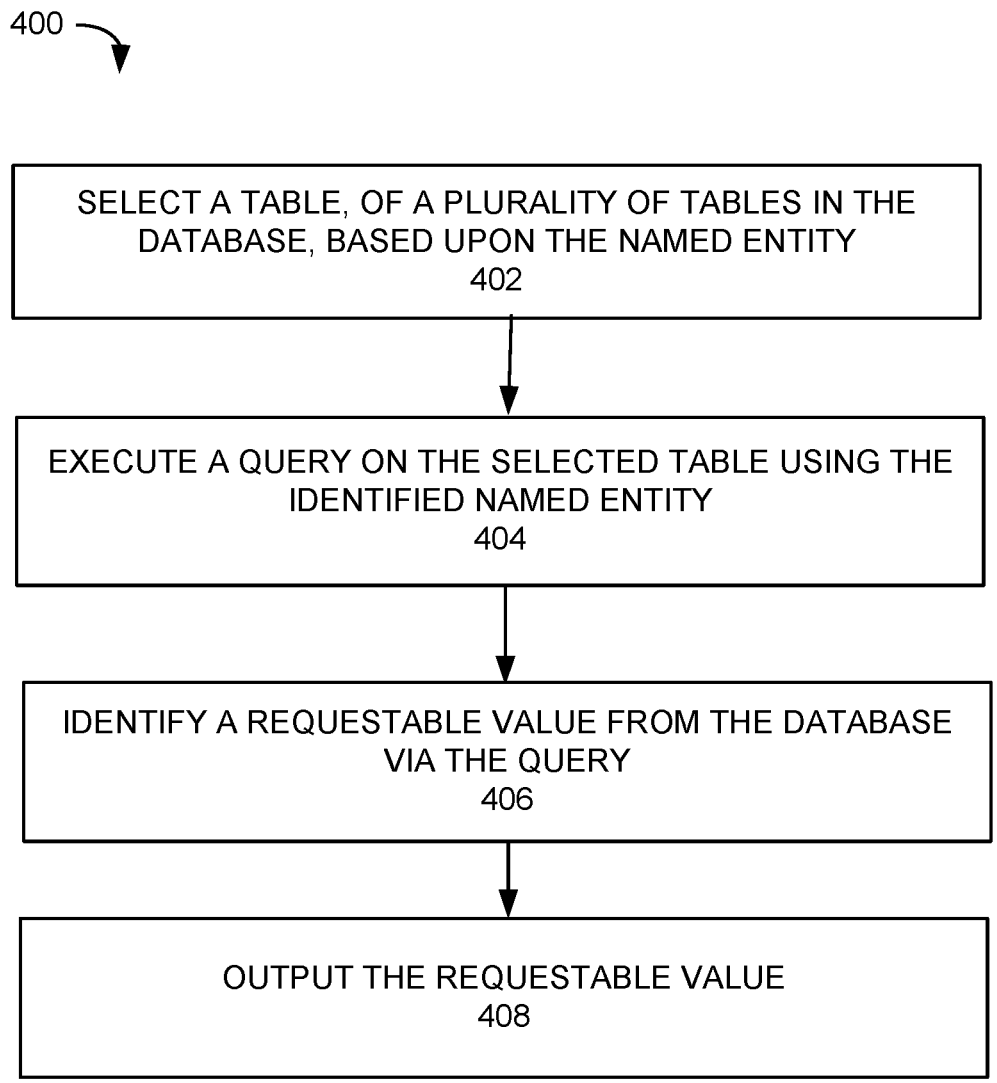
FIG. 4 is a simplified flowchart depicting a method for using the database in answering a query according to certain embodiments.

FIG. 4 is a simplified flowchart depicting a method 400 for using the partner database in answering a user query according to certain embodiments. The method 400 may be used in generating the response at block 206 of FIG. 2. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 4 may be performed by the DM subsystem 116 of FIG. 1A in cooperation with other components of the dialog system 100 described above.

At 402, the dialog system selects a table, of a plurality of tables in the database (e.g., partner database 175), based upon the named entity identified at 204. As described above with respect to FIGS. 1A and 1B, the dialog system stores, or is communicatively coupled to, a partner database 175 that stores a plurality of tables (e.g., tables 175A, 175B, . . . 175N). The different tables may correspond to different types of goods, services, or types of information. The dialog system selects a particular table in the partner database 175 based upon one or more named entities identified at 204. The dialog system may select a table that contains the named entity identified at 204.

For example, the dialog system identifies multiple named entities and selects the table that includes all the named entities recognized at 204, or the most named entities recognized. Alternatively, or additionally, the NERs that generate a match may be used to identify the table. As a specific example, in the user request "How much is a case of Jimmy's seltzer?", a "brand" NER recognizes "Jimmy's", a "drink type" NER recognizes "seltzer", and an "quantity" NER recognizes "case." Because these 3 NER models match the user query, the system decides that this query probably concerns a database table about drinks. Alternatively, or additionally, selection of the table may be based upon contextual information derived from the utterance. For example, if the user is asking for a price, this may narrow down the selection between a table that includes prices and a table that does not include prices.

At 404, the dialog system (e.g., the DM subsystem 116) executes a query on the selected table using the identified named entity. The dialog system may execute the query using one or more named entities identified at 204, which may correspond to informable values in the table. As an example, the dialog system executes a Structured Query Language (SQL) query with parameters including the informable values. The query may further include information characterizing a type of requestable value requested. As a specific example, the dialog system may generate and execute the following query on the identified table:

SELECT stock_status, price FROM shoe_tbl WHERE style=tennis AND color=black to retrieve a set of values corresponding to the stock status and price of all black tennis shoes in the table shoe_tbl.

In some embodiments, the NLU subsystem includes a plurality of NER models which have been trained on the data in a set of tables comprising informable values and requestable values. The NLU subsystem may use one or more NER models trained to identify informable values in the table and use this information to retrieve requestable values. For example, with reference to the example tables 500 and 550 in FIGS. 5A and 5B, colors and brand names may be recognized as informable values, while the terms price and stock may be recognized as corresponding to requestable values.

In some embodiments, the dialog system prompts the user for additional information in preparation for executing the query. After consulting the table, the dialog system may make a determination to ask the user for any required informable column information. As an example, the dialog system may determine that the location of the store the user wants information about is needed in order to determine whether a particular item is in-stock. As another example, the dialog system has identified that the received user input relates to shoes, but cannot determine whether the user is interested in men's shoes, women's shoes, or children's shoes. In such a situation, the dialog system may output (e.g., via speech output) a request for clarification. For example, the dialog system prepares, and transmits to the user, the phrase "Do you want women's shoes, men's shoes, or children's shoes?". The dialog system may then receive second clarifying speech input (e.g., "women's") and use the second speech input to select the appropriate table.

At 406, the dialog system identifies a requestable value from the database via the query. The result of the query executed at 404 includes one or more requestable values, of the plurality of requestable values in the table, that maps to the identified named entity. The output of the query is one or more values in the table corresponding to requestable values. This may correspond to the speech input received at 202 (e.g., a particular piece of information requested by the user). Accordingly, the dialog system identifies one or more requestable values by querying a table in the database using one or more named entities. For example, based upon input named entities Tennis and Black, the dialog system identifies the requestable value $49.99, corresponding to the price of black tennis shoes.

At 408, the dialog system outputs the identified requestable value. As described above with respect to 206 and 208 of FIG. 2, The dialog system may generate and provide a response (e.g., to a user). This response may include one or more requestable values, or derivatives thereof, as identified at 406. A derivative of a requestable value is a word, phrase, image, or the like, which has been derived from a requestable value. For example, a derivative of the requestable value "in-stock" can be a phrase or image that represents that an item is in stock (e.g., "it is available," "we have 5 left," and so forth).

FIGS. 5A and 5B depict simplified examples of database tables according to certain embodiments. These tables may be used to train an NER and/or perform lookup functions based upon received speech input. The tables presented in FIGS. 5A and 5B described below are intended to be illustrative and non-limiting. As described above, the partner system 170 may maintain a partner database 175 containing tables 175A, 175B, . . . 175N. These tables may store information such as values corresponding to products, services, locations, statistics, and so forth. FIGS. 5A and 5B illustrate two examples of such tables.

In FIG. 5A, a table 500 is shown which contains entries related to women's shoes. The table 500 includes columns for the named entity types brand 502, size 504, color 506, style 508, stock status 510, and price 512. The rows below each column heading list various different shoe types maintained in the database. The columns fall into two categories—informable columns 514 and requestable columns 516.

The informable columns 514 are columns for storing data elements associated with input which may be received by the system. For example, a user may search for a particular brand, size, or style of shoes. The dialog system can receive a user query that includes one or more such informable values (e.g., "Do you have any size 4, black sandals?").

The requestable columns 516 are columns for storing data elements associated with information that may be requested of the dialog system. For example, a user may ask how much a particular shoe costs. Accordingly, the price column 512 has been designated as a requestable column.

Table 500 may be used for handling requests related to women's shoes. The informable columns 514 include brand 502, size 504, color 506, and style 508. Examples of brands 502 listed in table 500 are Allen's, Runner's, etc. Examples of sizes 504 listed in table 500 are 4, 12, etc. Examples of colors 506 listed in table 500 are black, white, etc. Examples of styles 508 listed in table 500 are Loafer, Sandal, etc. The table can be queried to identify entries corresponding to a received speech input, such as "size 5 black sandals."

The requestable columns 516 include stock status 510 and price 512. The stock status 510 may specify whether a particular shoe type is available (e.g., OUT of stock or IN stock). Examples of prices 512 listed in table 500 are $59.99, $34.99, etc. The table 500 can be queried to identify entries corresponding to a received speech input, such as "Do you any size 5 black sandals? . . . How much do they cost?"

In FIG. 5B, a table 550 is shown which contains entries related to men's pants. The table 550 includes columns for brand 552, size 554, color 556, style 558, stock status 560, and price 562. The rows below list various different men's pant types maintained in the database. The columns fall into two categories—informable columns 564 and requestable columns 566, as described above with respect to FIG. 5A.

Table 550 may be used for handling requests related to men's shoes. The informable columns 564 include brand 552, size 554, color 556, and style 558. Examples of brands 552 listed in table 550 are Maxy, Zeus, etc. Examples of sizes 554 listed in table 550 are 32R, 33L, etc. Examples of colors 556 listed in table 550 are black, beige, etc. Examples of styles 558 listed in table 550 are Casual, Dress, etc. The table can be queried to identify entries corresponding to a received speech input, such as "Maxy pants in black."

The informable columns 564 include stock status 560 and price 562. The stock status 560 may specify whether a particular pant type is available (e.g., OUT of stock or IN stock). Examples of prices 562 listed in table 550 are $64.99, $199.99, etc. The table 550 can be queried to identify entries corresponding to a received speech input, such as "How much are the Cricket jeans?".

The techniques described herein have multiple advantages. Training a NER using data derived from databases or knowledge bases expands the amount of information available to the NER, which improves the accuracy of the dialog system overall.

Further, the amount of resources spent on training can be significantly reduced using the techniques disclosed herein. As described above, generally machine learning models must be trained using labeled data. The data is commonly hand-labeled, which is a time-consuming process. Using a database to derive training data as disclosed herein can greatly reduce or eliminate the need for labeled training data. By eliminating or reducing the amount of resources required to produce training data, the techniques disclosed herein can be used to reduce the amount of time and computation needed to generate models for performing dialog-related tasks.

The infrastructure described above can be implemented in various different environments including a cloud environment (could be various types of clouds including private, public, and hybrid cloud environments), on-premises environment, a hybrid environment, and the like.

Figure 6:
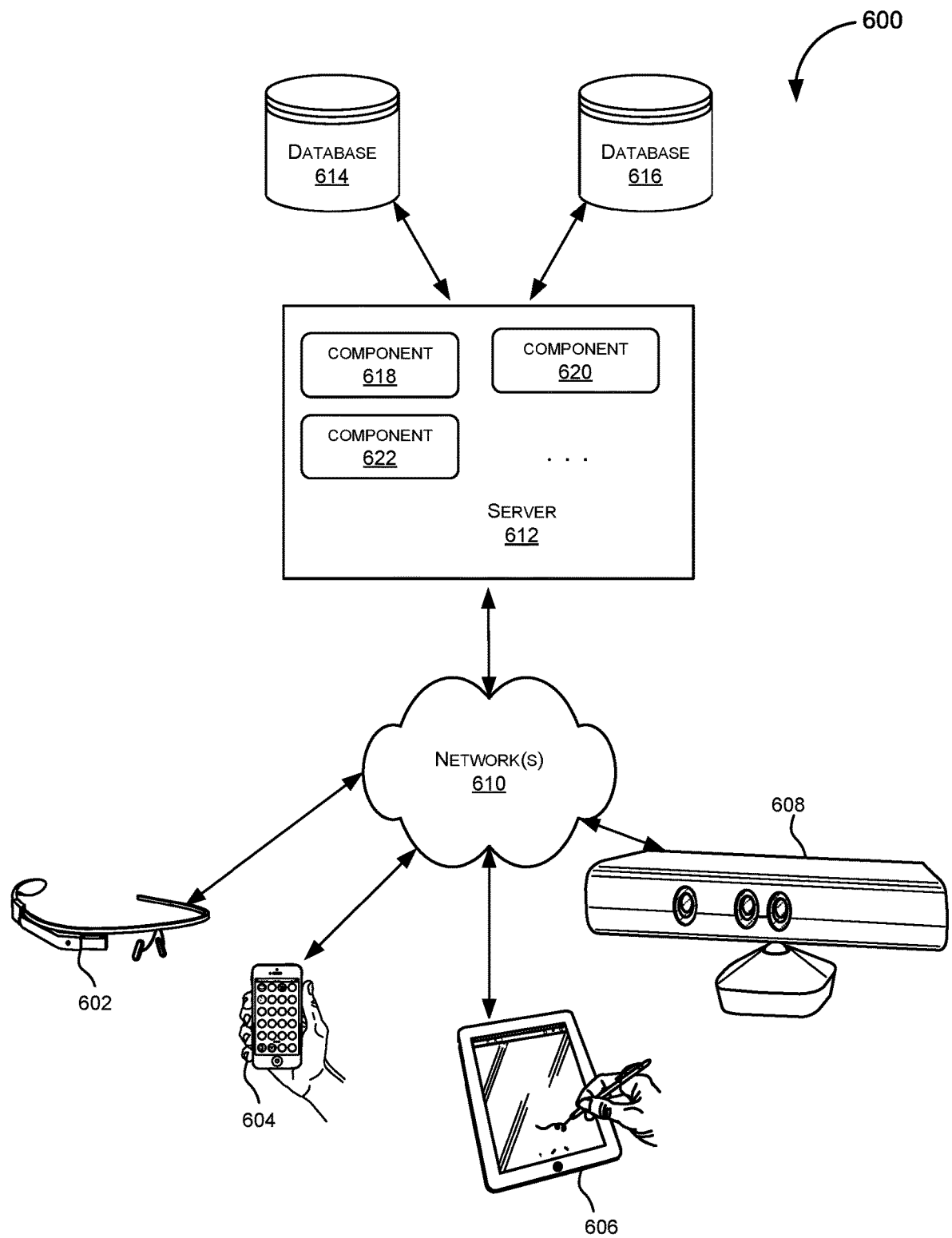
FIG. 6 depicts a simplified diagram of a distributed system for implementing an embodiment.

FIG. 6 depicts a simplified diagram of a distributed system 600 for implementing an embodiment. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various embodiments, server 612 may be adapted to run one or more services or software applications that enable dialog tasks to be performed using database tables.

In certain embodiments, server 612 may also provide other services or software applications that can include non-virtual and virtual environments. In some embodiments, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 to provide user input which the system can use in performing dialog tasks in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various embodiments, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain embodiments. For example, one or more of the data repositories 614, 616 may be used to store information such as dialog history. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain embodiments, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 614, 616 may also be used by applications to store application data. The data repositories used by applications may be of different types such as, for example, a key-value store repository, an object store repository, or a general storage repository supported by a file system.

Figure 7:
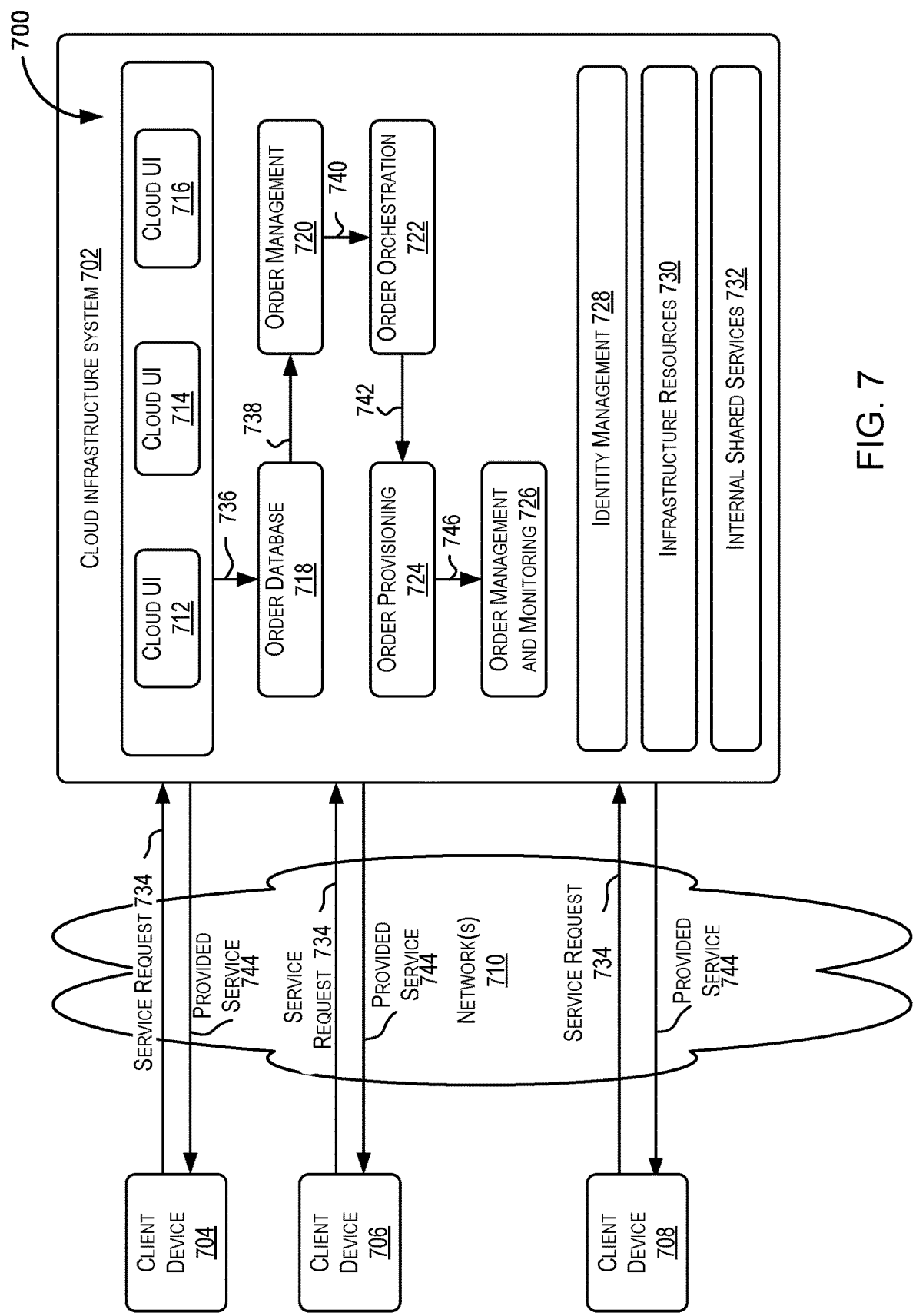
FIG. 7 is a simplified block diagram of a cloud-based system environment in which various storage-related services may be offered as cloud services, in accordance with certain embodiments.

In certain embodiments, the NLU-related functionalities described in this disclosure may be offered as services via a cloud environment. FIG. 7 is a simplified block diagram of a cloud-based system environment in which various NLU-related services may be offered as cloud services, in accordance with certain embodiments. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 712. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other embodiments, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative embodiments.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, cloud infrastructure system 702 uses historical context to influence dialog tasks. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer can be an individual or an enterprise. In certain other embodiments, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 702 and the services provided may be shared by several organizations in a related community. Various other models such as hybrids of the above mentioned models may also be used.

Client computing devices 704, 706, and 708 may be of different types (such as devices 702, 704, 706, and 708 depicted in FIG. 7) and may be capable of operating one or more client applications. A user may use a client device to interact with cloud infrastructure system 702, such as to request a service provided by cloud infrastructure system 702. For example, a user may use a client device to request a NLU-related service described in this disclosure.

In some embodiments, the processing performed by cloud infrastructure system 702 for providing NLU-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for identifying a named entity based upon received speech input. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain embodiments, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for a NLU-related service offered by cloud infrastructure system 702. As part of the order, the customer may provide speech input identifying a request.

In certain embodiments, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services. In certain embodiments, for a customer requesting the NLU-related service, the response may include a response generated based upon an identified intent.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain embodiments, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
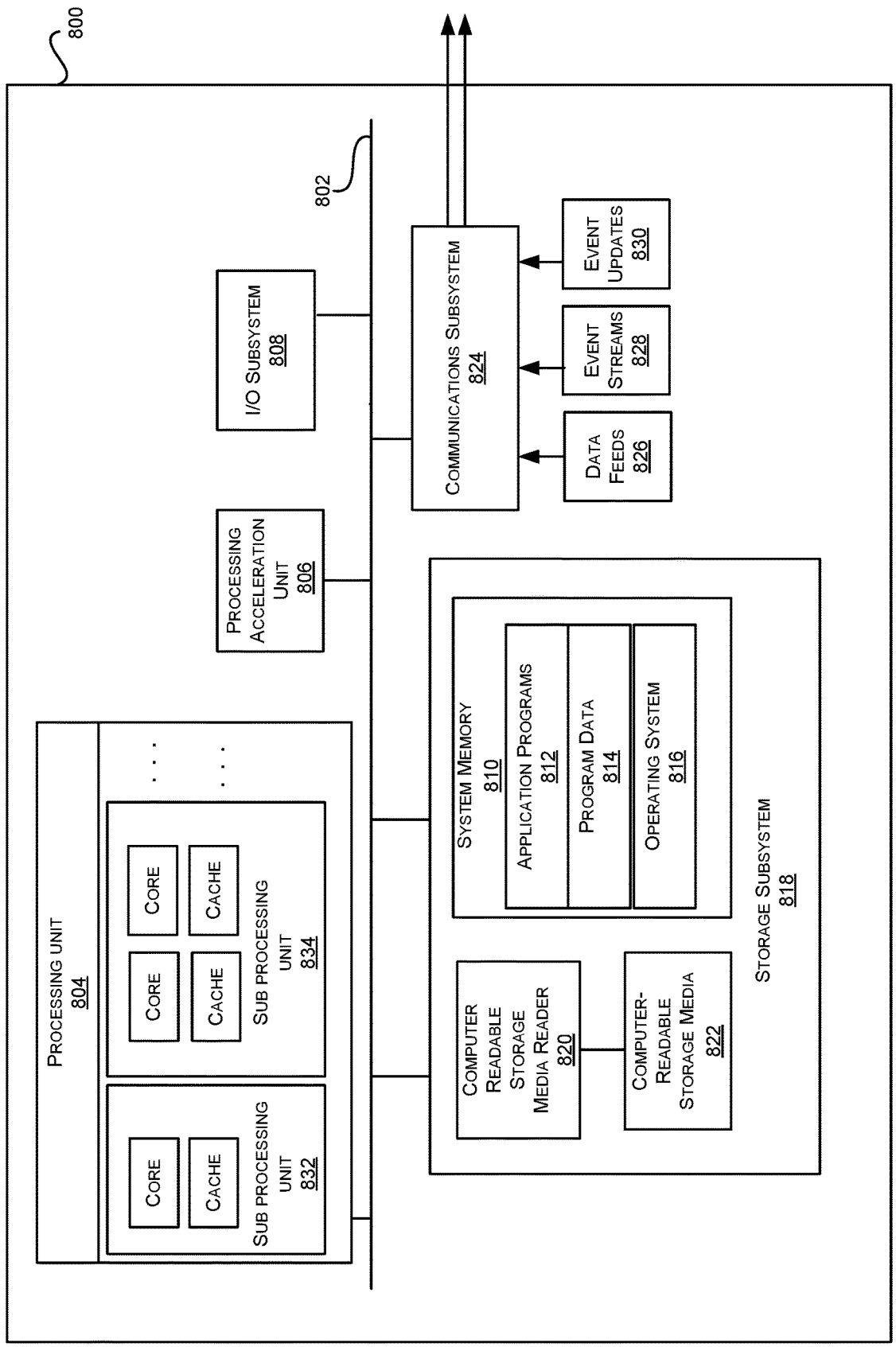
FIG. 8 illustrates an exemplary computer system that may be used to implement certain embodiments.

FIG. 8 illustrates an exemplary computer system 800 that may be used to implement certain embodiments. For example, in some embodiments, computer system 800 may be used to implement any of the ASR subsystem, NLU subsystem, and various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1486.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 842, 844, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some embodiments. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, the communication subsystem may be used to communicate with a database to execute a query to identify requestable values.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 840, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 840, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 840, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   extracting data from a database, the database comprising a plurality of columns, wherein the extracted data includes a plurality of named entities extracted from a first column of the plurality of columns;
   generating training data from the extracted data, the generating comprising using a named entity type corresponding to a heading associated with the first column and the extracted plurality of named entities as seed data to label each named entity of the plurality of named entities with the named entity type;
   training a machine learning model using the generated training data;
   receiving, by a dialog system, a spoken utterance;
   identifying, by the dialog system, a named entity from the spoken utterance using the trained machine learning model;
   generating, by the dialog system, a speech response based upon the identified named entity; and
   providing, by the dialog system, the speech response as output.

2. The method of claim 1, wherein generating the training data further comprises:
   identifying the heading based on metadata associated with the first column of the database.

3. The method of claim 1, wherein:
   the machine learning model is a first machine learning model and the named entity is a first named entity; and
   the method further comprises identifying a second named entity using a second machine learning model.

4. The method of claim 1, wherein:
   the database further comprises a plurality of requestable values; and
   the method further comprises:
   identifying, by the dialog system using the database, a requestable value, of the plurality of requestable values, that maps to the identified named entity,
   wherein the speech response includes the requestable value or a derivative thereof.

5. The method of claim 4, wherein:

the database comprises a plurality of tables; and the method further comprises selecting a particular table from the plurality of tables based upon the identified named entity, wherein the selected table is used to identify the requestable value.

6. The method of claim 5, wherein identifying the requestable value comprises executing a query on the selected table to retrieve the requestable value mapped to the identified named entity.

7. A non-transitory computer-readable memory storing a plurality of instructions executable by one or more processors, the plurality of instructions comprising instructions that when executed by the one or more processors cause the one or more processors to perform processing comprising:

extracting data from a database, the database comprising a plurality of columns, wherein the extracted data includes a plurality of named entities extracted from a first column of the plurality of columns;

generating training data from the extracted data, the generating comprising using a named entity type corresponding to a heading associated with the first column and the extracted plurality of named entities as seed data to label each named entity of the plurality of named entities with the named entity type;

training a machine learning model using the generated training data;

receiving a spoken utterance;

identifying a named entity from the spoken utterance using the trained machine learning model;

generating a speech response based upon the identified named entity; and providing the speech response as output.

8. The non-transitory computer-readable memory of claim 7, wherein generating the training data further comprises:

identifying the heading based on metadata associated with the first column of the database.

9. The non-transitory computer-readable memory of claim 7, wherein:

the machine learning model is a first machine learning model and the named entity is a first named entity; and the processing further comprises identifying a second named entity using a second machine learning model.

10. The non-transitory computer-readable memory of claim 7, wherein:

the database further comprises a plurality of requestable values; and the processing further comprises:

identifying, using the database, a requestable value, of the plurality of requestable values, that maps to the identified named entity, wherein the speech response includes the requestable value or a derivative thereof.

11. The non-transitory computer-readable memory of claim 10, wherein:

the database comprises a plurality of tables; and the processing further comprises selecting a particular table from the plurality of tables based upon the identified named entity, wherein the selected table is used to identify the requestable value.

12. The non-transitory computer-readable memory of claim 11, wherein identifying the requestable value comprises executing a query on the selected table to retrieve the requestable value mapped to the identified named entity.

13. A dialog system comprising:

one or more processors;

a memory coupled to the one or more processors, the memory storing a plurality of instructions executable by the one or more processors, the plurality of instructions comprising instructions that when executed by the one or more processors cause the one or more processors to perform processing comprising:

extracting data from a database, the database comprising a plurality of columns, wherein the extracted data includes a plurality of named entities extracted from a first column of the plurality of columns;

generating training data from the extracted data, the generating comprising using a named entity type corresponding to a heading associated with the first column and the extracted plurality of named entities as seed data to label each named entity of the plurality of named entities with the named entity type;

training a machine learning model using the generated training data;

receiving a spoken utterance;

identifying a named entity from the spoken utterance using the trained machine learning model;

generating a speech response based upon the identified named entity; and providing the speech response as output.

14. The dialog system of claim 13, wherein generating the training data further comprises:

identifying the heading based on metadata associated with the first column of the database.

15. The dialog system of claim 13, wherein:

the machine learning model is a first machine learning model and the named entity is a first named entity; and the processing further comprises identifying a second named entity using a second machine learning model.

16. The dialog system of claim 13, wherein:

the database further comprises a plurality of requestable values; and the processing further comprises:

identifying, using the database, a requestable value, of the plurality of requestable values, that maps to the identified named entity, wherein the speech response includes the requestable value or a derivative thereof.

17. The dialog system of claim 16, wherein:

the database comprises a plurality of tables; and the processing further comprises selecting a particular table from the plurality of tables based upon the identified named entity, wherein the selected table is used to identify the requestable value.

* * * * *

UNITED STATES PATENT AND TRADEMARK OFFICE
CERTIFICATE OF CORRECTION

| | |
|---|---|
| PATENT NO. | : 11,514,911 B2 |
| APPLICATION NO. | : 16/983950 |
| DATED | : November 29, 2022 |
| INVENTOR(S) | : Johnson et al. |

It is certified that error appears in the above-identified patent and that said Letters Patent is hereby corrected as shown below:

In the Specification

In Column 17, Line 47, delete "Mobile" and insert -- Mobile®, --, therefor.

In Column 17, Line 50, delete "iPhone)," and insert -- iPhone®), --, therefor.

Signed and Sealed this
Eighth Day of August, 2023

*Katherine Kelly Vidal*

Katherine Kelly Vidal
*Director of the United States Patent and Trademark Office*